(12) United States Patent
Yang

(10) Patent No.: US 7,887,357 B1
(45) Date of Patent: Feb. 15, 2011

(54) CARD CONNECTOR HAVING AN IMPROVED SHIELDING COVER

(75) Inventor: Chih-Lin Yang, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/761,388

(22) Filed: Apr. 15, 2010

(51) Int. Cl.
*H01R 13/62* (2006.01)

(52) U.S. Cl. ...................... 439/331; 439/630

(58) Field of Classification Search .......... 439/326, 439/331, 630
See application file for complete search history.

(56) References Cited

U.S. PATENT DOCUMENTS

| | | | |
|---|---|---|---|
| 6,805,570 B1 * | 10/2004 | Lee | 439/326 |
| 7,048,566 B2 * | 5/2006 | Natori | 439/326 |
| 7,160,129 B2 * | 1/2007 | Yin | 439/331 |
| 7,270,559 B1 * | 9/2007 | Chen | 439/326 |
| 2005/0245136 A1 * | 11/2005 | Yin et al. | 439/630 |

* cited by examiner

*Primary Examiner*—Tho D Ta
(74) *Attorney, Agent, or Firm*—Cheng-Ju Chiang

(57) ABSTRACT

A card connector includes an insulating housing, a plurality of terminals, a grounding member, and a shielding cover. The insulating housing defines a card-receiving cavity in a top surface thereof for receiving an electronic card. The terminals are received in the insulating housing for electrically connecting with the electronic card. The grounding member is assembled to a portion of one side surface of the insulating housing. The shielding cover is pivotally and slidably mounted to the insulating housing, having a cover plate and two side plates bent from two opposite sides of the cover plate. When the shielding cover slides to a locked condition, one side plate of the shielding cover is moved to electrically abut against the grounding member from an unconnected condition for shielding an EMI.

7 Claims, 5 Drawing Sheets

CARD CONNECTOR HAVING AN IMPROVED SHIELDING COVER

BACKGROUND OF THE INVENTION

1. Field of the Invention

The present invention relates to a card connector, and more particularly to a hinge-type card connector capable of shielding an EMI (Electro Magnetic Interference).

2. The Related Art

Generally, plug-type card connector and hinge-type card connector are two common kinds of card connector in the card connector sphere. A conventional plug-type card connector includes an insulating housing, a plurality of terminals received in the insulating housing, and a shielding cover covered on the insulating housing and soldered to a PCB (Printed Circuit Board) for shielding an EMI. Being different from the plug-type card connector, the shielding cover of the hinge-type card connector is pivotally assembled to the insulating housing. In this regard, the shielding cover of the hinge-type card connector could not be soldered to the PCB for shielding an EMI, which will influences a signal transmission between the terminals and an electronic card. Therefore, it is desirable to have a hinge-type card connector capable of shielding an EMI to overcome the problem encountered in the prior art.

SUMMARY OF THE INVENTION

It is an object of the present invention to provide a card connector capable of shielding an EMI. The card connector for receiving an electronic card includes an insulating housing, a plurality of terminals, a grounding member, and a shielding cover. The insulating housing defines a card-receiving cavity in a top surface thereof for receiving the electronic card. The terminals are received in the insulating housing for electrically connecting with the electronic card. The grounding member is assembled to a portion of one side surface of the insulating housing. The shielding cover is pivotally and slidably mounted to the insulating housing. The shielding cover has a cover plate and two side plates respectively bent from two opposite sides of the cover plate. One side plate of the shielding cover is moved to abut against the grounding member from an unconnected condition, when the shielding cover slides to a locked condition.

As described above, by arranging the grounding member at the side surface of insulating housing, the card connector is capable of shielding the EMI when the shielding cover slides to lock the card connector and make the side plate electrically abut against the grounding member.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
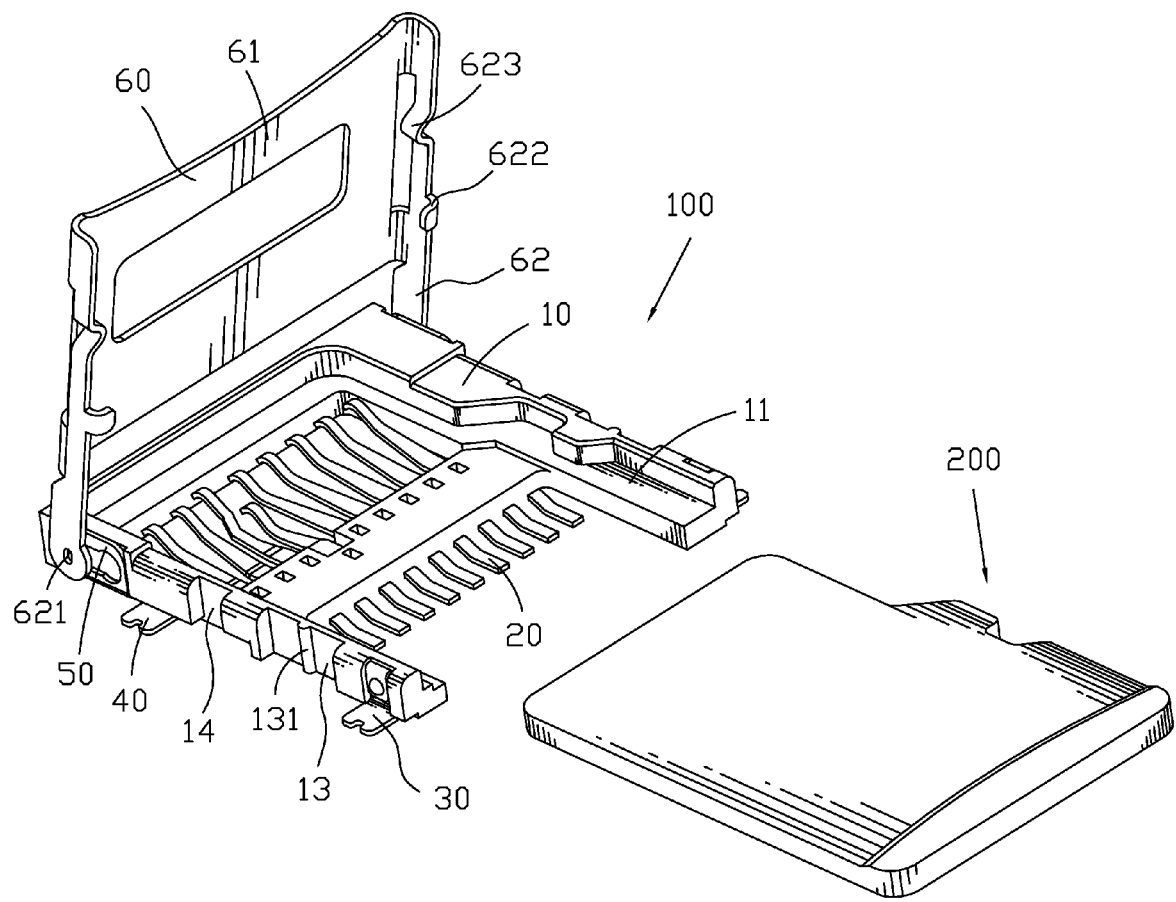
FIG. 1 is a perspective view of a card connector according to the present invention in its open condition and an electronic card mated with the card connector.

With reference to FIG. 1, a card connector 100 according to the present invention in its open condition and an electronic card 200 mated with the card connector 100 are shown. The card connector 100 includes an insulating housing 10, a plurality of terminals 20 received in the insulating housing 10, a pair of grounding members 30, a pair of fastening members 40, and a pair of support members 50 all mounted to two opposite sides of the insulating housing 10, and a shielding cover 60 pivotally and slidably mounted to a rear end of the insulating housing 10.

Figure 2:
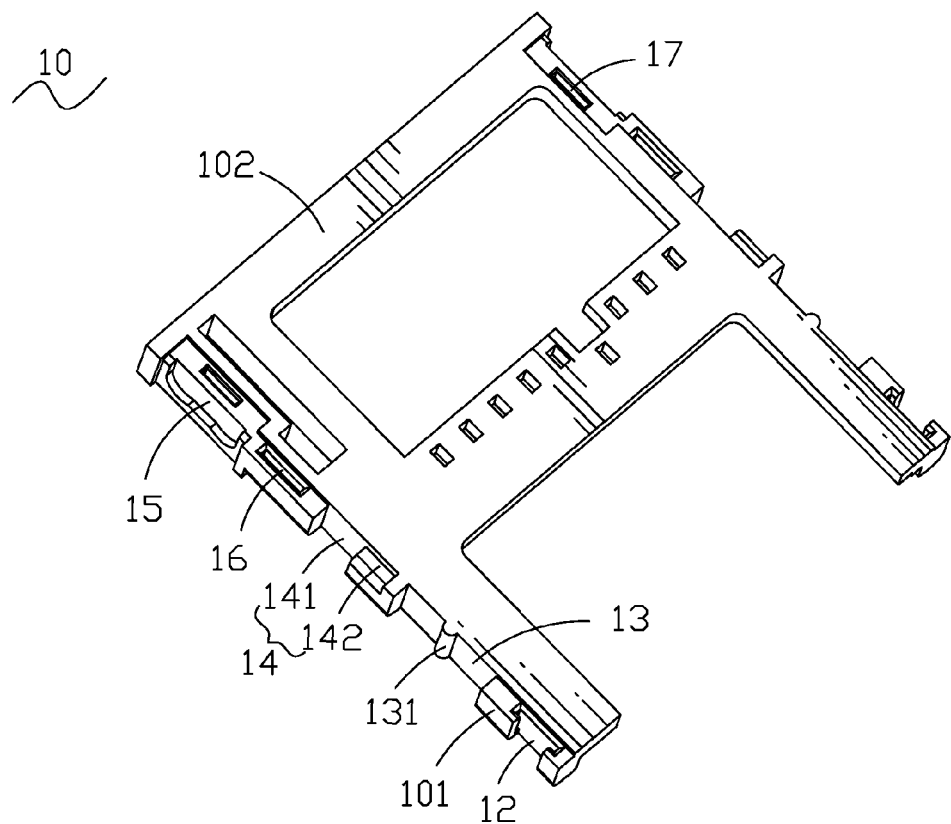
FIG. 2 is a perspective view of an insulating housing of the card connector.

With reference to FIG. 1 and FIG. 2, the insulating housing 10 is shaped as a flat board and defines a card-receiving cavity 11 in a top surface thereof for receiving the electronic card 200. The terminals 20 are mounted to the insulating housing 10 with distal ends thereof arched into the card-receiving cavity 11 for electrically connecting with the electronic card 200.

The insulating housing 10 defines an engaging hole 12, a sliding recess 13, a substantial L-shaped groove 14, and a pivot slot 15 at each side surface 101 thereof along an insertion direction of the electronic card 200. In this embodiment, the engaging hole 12 is arranged at a front end of each side surface 101 of the insulating housing 10 while the pivot slot 15 is arranged at a rear end of each side surface 101 of the insulating housing 10. The L-shaped groove 14 is defined at a substantially middle portion of each side surface 101 of the insulating housing 10 and includes a vertical branch 141 and a horizontal branch 142 extended frontward from a bottom of the vertical branch 141. The sliding recess 13 is located between the engaging hole 12 and the L-shaped groove 14 and provides an erect pillar 131 projected outwardly at an intermediate portion thereof. In a bottom surface 102 of the insulating housing 10, a fixing hole 16 and an insertion hole 17 are defined at a rear portion of each side surface 101 thereof. The insertion hole 17 is arranged at a position corresponding to the pivot slot 15 and the fixing hole 16 is arranged in front of the insertion hole 17 and behind the L-shaped groove 14.

Referring to FIG. 1 again, the shielding cover 60 has a cover plate 61 and two side plates 62 respectively bent from two opposite sides of the cover plate 61. Each side plate 62 has a concave portion 623 concaved inwardly from a portion adjacent to one end thereof, a locking tab 622 bent inwardly from a middle portion thereof, and a pivot boss 621 projected inwardly from the other end thereof.

Figure 3:
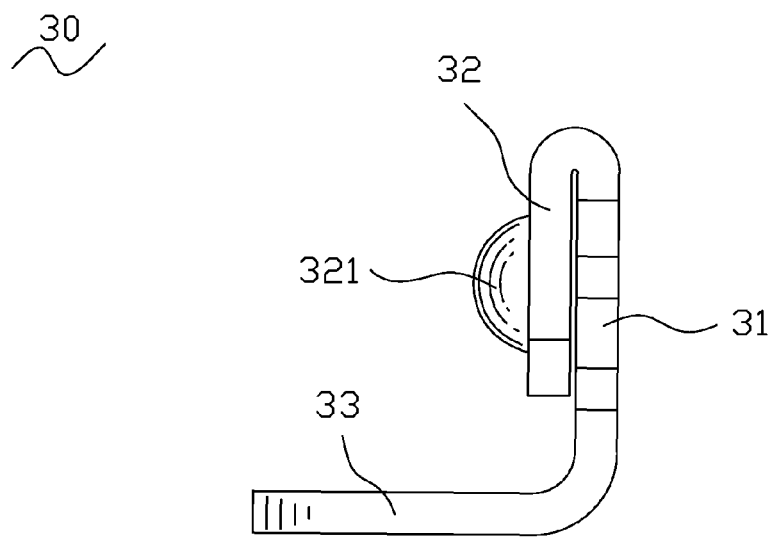
FIG. 3 is a lateral view of a grounding member of the card connector.

Referring to FIG. 3, the grounding member 30 has an upright engaging portion 31, a flat soldered portion 33 extended horizontally from a bottom of the engaging portion 31, and a fold portion 32 folded towards the soldered portion 33 from a top of the engaging portion 31. The fold portion 32 has a contact protrusion 321 formed at an outer surface thereof.

Figure 4:
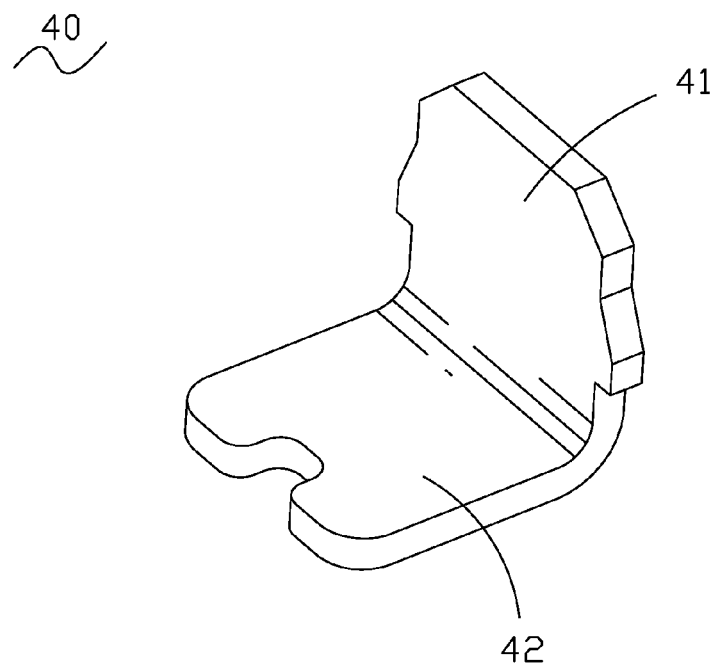
FIG. 4 is a perspective view of a fastening member of the card connector.
Figure 5:
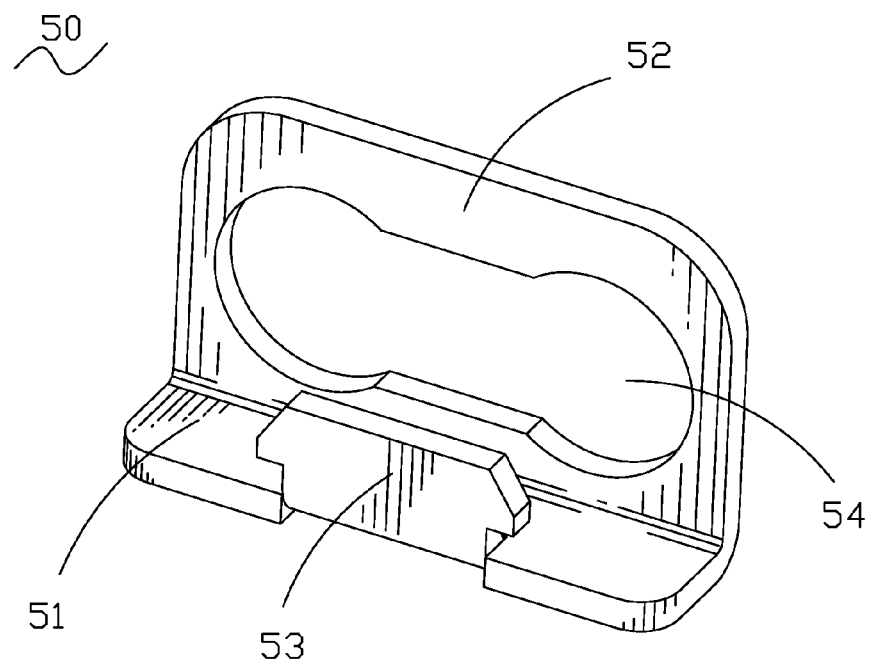
FIG. 5 is a perspective view of a support member of the card connector.

Referring to FIG. 4 and FIG. 5, the fastening member 40 is formed as substantial L-shape, having a vertical fixing portion 41 and a level soldered portion 42 extended horizontally from a bottom of the fixing portion 41. The support member 50 has a long and narrow bottom board 51, a side board 52 extended upwardly from a long side of the bottom board 51, and an insertion portion 53 extended upwardly from a middle of the other long side of the bottom board 51 opposite to the side board 52. The side board 52 defines a guiding slot 54 penetrated therethrough.

In assembly, the engaging portions 31 of the grounding members 30 are engaged into the engaging holes 12 to make the grounding members 30 assembled to the insulating housing 10. The flat soldered portions 33 of the grounding members 30 are extended outwardly to be soldered to ground wires of a PCB (not shown). The contact protrusions 321 are protruded beyond the side surfaces 101 of the insulating housing 10. The fixing portions 41 of the fastening members 40 are fixed into the fixing holes 16 to make the fastening members 40 assembled to the insulating housing 10. The level soldered portions 42 of the fastening members 40 are extended outwardly to be soldered to the PCB. The insertion portions 53 of the support members 50 are inserted into the insertion holes 17 to make the support members 50 assembled to the insulating housing 10. The bottom boards 51 are attached to the bottom surface of the insulating housing 10. The side boards 52 are attached to the side surfaces 101 of the insulating housing 10 with the guiding slots 54 corresponding to the pivot slots 15. The pivot bosses 621 of the shielding cover 60 are buckled into the guiding slots 54 so that the shielding cover 60 is pivotally assembled to the insulating housing 10.

Figure 6:
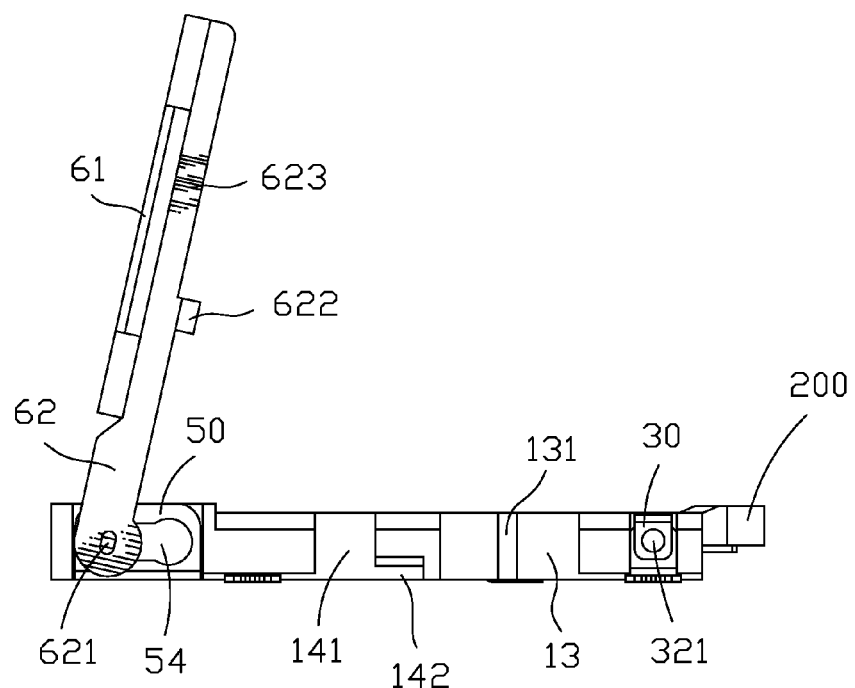
FIGS. 6 to 8 are lateral views showing an operation process of mounting the electronic card to the card connector.
Figure 7:
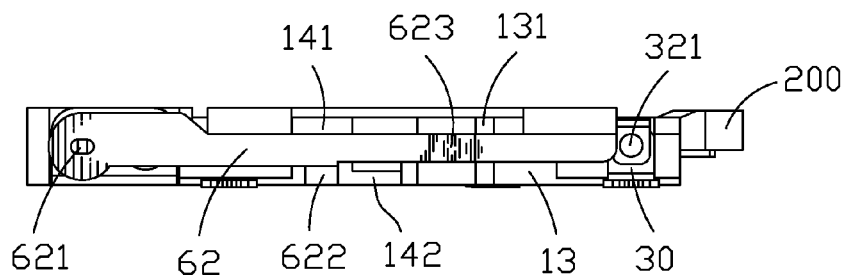
Figure 8:
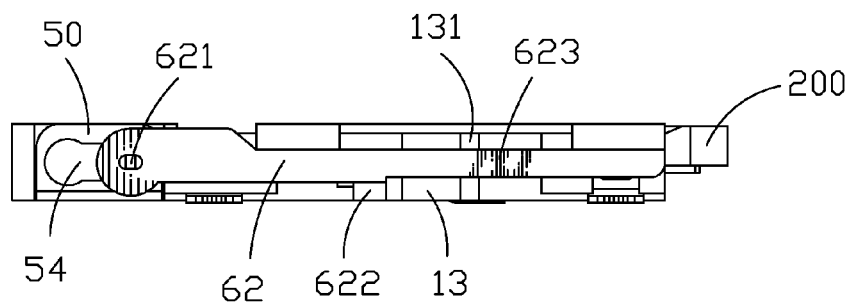

With reference to FIGS. 6 to 8, which show an operation process of mounting the electronic card 200 to the card connector 100. In FIG. 6, the electronic card 200 is placed in the card-receiving cavity 11 when the shielding cover 60 is opened. Then close the shielding cover 60 towards the insulating housing 10 until the cover plate 61 covers on the electronic card 200, as shown in FIG. 7. In this case, the card connector 100 is in a closed but unlocked condition with the pivot bosses 621 located at rear ends of the guiding slots 54, the locking tabs 622 located in the vertical branches 141 of the L-shaped grooves 14 and the concave portions 623 located at rear ends of the sliding recesses 13 behind the erect pillars 131. Meanwhile, front ends of the side plates 62 are in rear of the grounding members 30 at an unconnected condition. For locking the card connector 100, a user may slide the shielding cover 60 forward to cause the pivot bosses 621 to move forward from the rear ends of the guiding slots 54 to front ends of the guiding slots 54. At the same time, the locking tabs 622 are caused to slide forward to be located in the horizontal branches 142 of the L-shaped grooves 14, the concave portions 623 are caused to slide forward and pass by the erect pillars 131 to be located in front ends of the sliding recesses 13. In this case, the card connector 100 is in a closed and locked condition as shown in FIG. 8.

Figure 9:
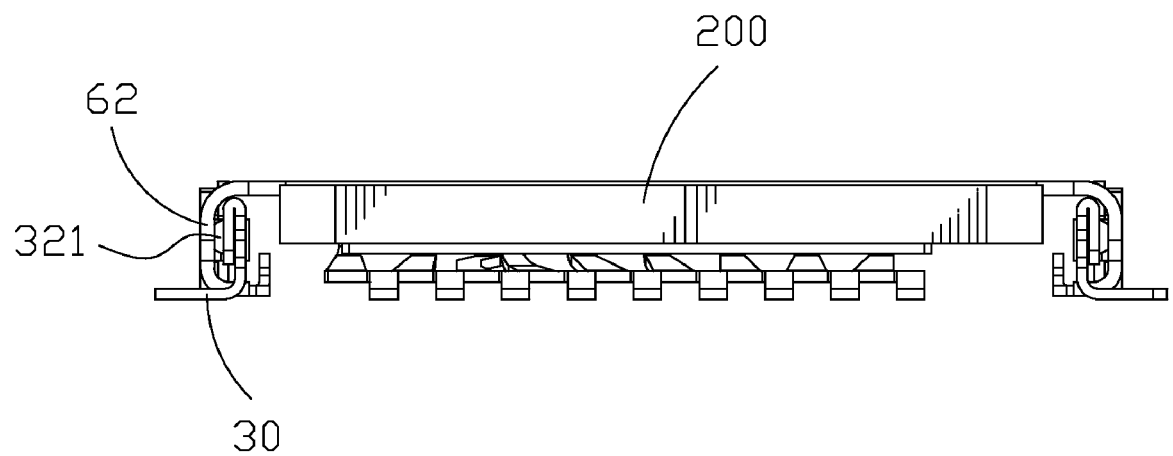
FIG. 9 is a front elevation view showing the electronic card has been received in the card connector in its closed, locked condition.

With reference to FIG. 9, when the shielding cover 60 slides forward to the locked condition, the side plates 62 are brought to move forward to electrically abut against the contact protrusions 321 of the grounding members 30 for shielding an EMI, because the soldered portions 33 of the grounding members 30 are soldered to the ground wires of the PCB.

As described above, by arranging the pair of grounding members 30 at the front ends of the side surfaces 101 of the insulating housing 10, the card connector 100 is capable of shielding the EMI when the shielding cover 60 slides forward to lock the card connector 100 and make inner sides of the side plates 62 electrically abut against the contact protrusions 321 of the grounding members 30.

What is claimed is:

1. A card connector for receiving an electronic card, comprising:
   an insulating housing defining a card-receiving cavity in a top surface thereof for receiving the electronic card;
   a plurality of terminals received in the insulating housing for electrically connecting with the electronic card;
   a grounding member assembled to a side surface of the insulating housing, the side surface of the insulating housing defining a sliding recess at a portion thereof, the sliding recess having an erect pillar projecting outwardly at an intermediate portion thereof; and
   a shielding cover pivotally and slidably mounted to the insulating housing, the shielding cover having a cover plate and two side plates respectively bent from two opposite sides of the cover plate, one of the side plates of the shielding cover having a concave portion concaved inwardly from a portion thereof;
   wherein the one of the side plates of the shielding cover is moved to electrically abut against the grounding member from an unconnected condition with the grounding member, when the shielding cover slides to a locked condition, and the concave portion enters a rear end of the sliding recess behind the erect pillar when the shielding cover is rotated to cover the insulating housing and then slides forward and passes by the erect pillar to locate in a front end of the sliding recess when the shielding cover slides forward to the locked condition.

2. The card connector as claimed in claim 1, wherein the side surface of the insulating housing defines a substantial L-shaped groove at a middle portion thereof, the L-shaped groove includes a vertical branch and a horizontal branch extended frontward from a bottom of the vertical branch, the side plate of the shielding cover has a locking tab bent inwardly from a middle portion thereof, the locking tab enters the vertical branch of the L-shaped groove when the shielding cover is rotated to cover on the insulating housing and then slid forward to locate in the horizontal branch of the L-shaped groove when the shielding cover slides forward to the locked condition.

3. The card connector as claimed in claim 1, wherein a rear end of the shielding cover is pivotally and slidably mounted to a rear end of the insulating housing, the grounding member is assembled to a front end of the side surface of the insulating housing, when the shielding cover is rotated to cover on the insulating housing, a front end of the shielding cover is in rear of the grounding member at the unconnected condition, when the shielding cover is slid forward to the locked condition, the front end of the shielding cover abuts against the grounding member.

4. The card connector as claimed in claim 3, wherein the front end of the side surface of the insulating housing defines an engaging hole, the grounding member has an upright engaging portion engaged into the engaging hole and a flat soldered portion extended outwardly from a bottom of the engaging portion, a fold portion is folded outwardly towards the soldered portion from a top of the engaging portion and has a smooth contact protrusion formed at an outer surface thereof, the contact protrusion is protruded beyond the side surface of the insulating housing for being against an inside of the side plate of the shielding cover firmly.

5. The card connector as claimed in claim 1, wherein a rear end of the side surface of the insulating housing defines a pivot hole, the side plate of the shielding cover has a pivot boss projected inwardly from a rear end thereof and mounted to the pivot hole of the insulating housing.

6. The card connector as claimed in claim 5, further comprising a support member assembled to the rear end of the side surface of the insulating housing, wherein the support member has a bottom board attached to a bottom surface of the insulating housing and a side board extended upwardly from an outer side of the bottom board to be attached to the side surface of the insulating housing, the side board defines a guiding slot penetrated therethrough for corresponding to the pivot hole, the pivot boss of the shielding cover is further mounted to the guiding slot.

7. The card connector as claimed in claim 6, wherein the bottom surface of the insulating housing defines an insertion hole at a rear portion thereof, the support member has an insertion portion extended upwardly from a middle of an inner side of the bottom board opposite to the side board for being inserted into the insertion hole.

* * * * *